May 14, 1929.  J. H. HAND  1,713,080

CHANGE SPEED GEARING

Filed Feb. 10, 1927  3 Sheets-Sheet 1

INVENTOR.
JESSE H. HAND
BY
Parker & Burton
ATTORNEY.

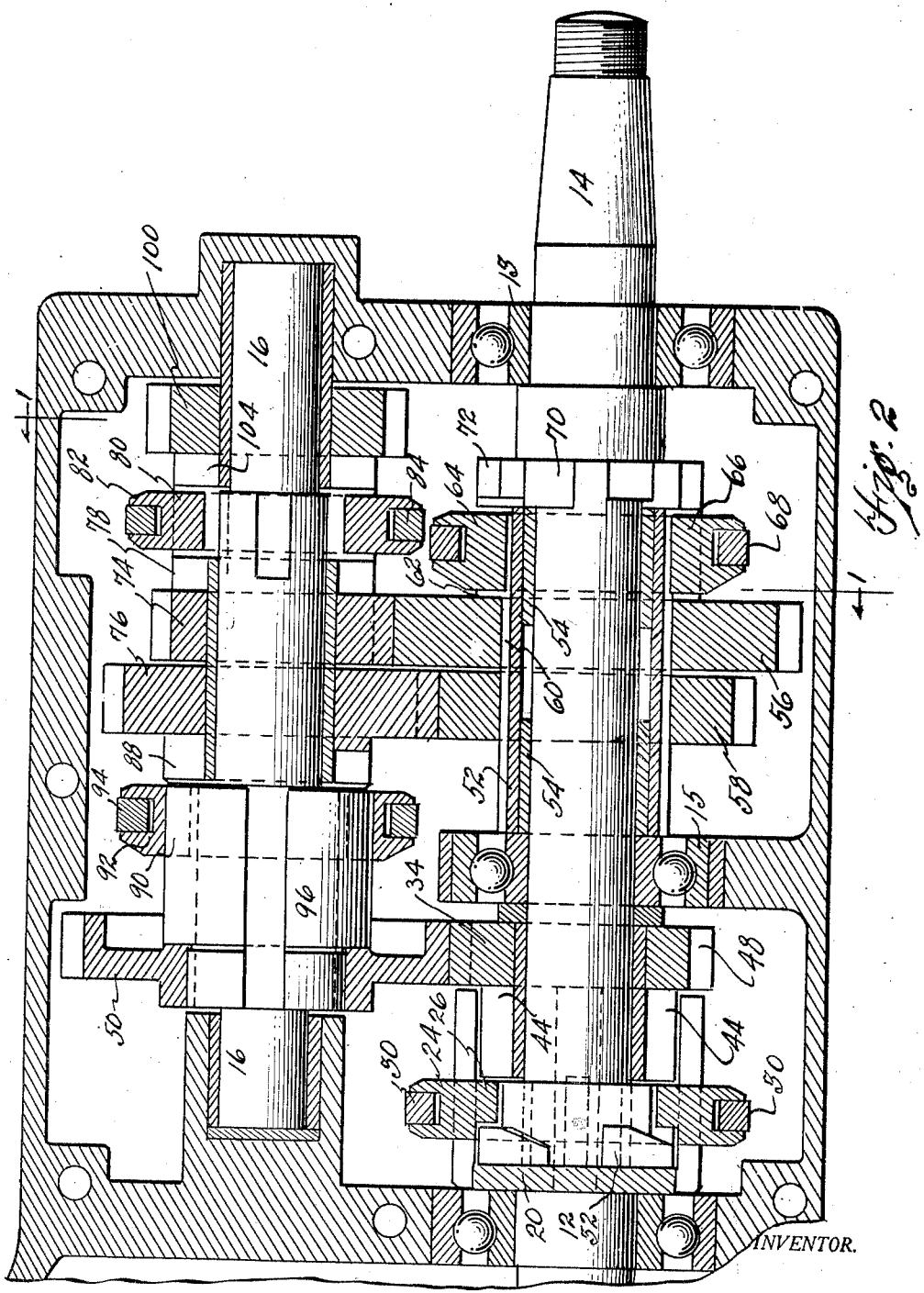

May 14, 1929.                J. H. HAND                1,713,080
                         CHANGE SPEED GEARING

Filed Feb. 10, 1927        3 Sheets-Sheet 3

INVENTOR.
                                        JESSE H. HAND
                                    BY
                                        Parker & Burton
                                              ATTORNEY.

Patented May 14, 1929.

1,713,080

UNITED STATES PATENT OFFICE.

JESSE H. HAND, OF CHICAGO, ILLINOIS.

CHANGE-SPEED GEARING.

Application filed February 10, 1927. Serial No. 167,158.

My invention relates to improvements in change speed gearing and particularly to gearing of the same general type as that illustrated in my Patent No. 1,517,836, dated December 2, 1924. The invention is embodied in change speed gearing wherein the gears are constantly in mesh and wherein the construction is such that in high speed the main shaft is coupled directly with the drive shaft to rotate therewith independently of all the change speed gears and wherein a hub is provided on the drive shaft adapted to receive the end of the main shaft and carrying a clutch member operable to lock the main shaft to the drive shaft for rotation therewith or to couple the main shaft with the drive shaft through the countershaft.

In change speed gearing, characterized as above set forth, an object of this invention is to facilitate the ready assembly or disassembly of the main shaft within the hub of the drive shaft by providing a clutch member on the end of the main shaft within the hub which is readily removable therefrom to permit withdrawal of the main shaft from the hub, leaving the clutch of the main shaft within the hub.

An additional object of the instant invention is the employment in change speed gearing of the type referred to of a reverse gear driven from the countershaft and which is constantly in mesh with one of the change speed gears on the main shaft normally employed to drive the main shaft in a forward direction. Specifically this reverse gear driving arrangement comprises a double unitary reverse gear, rotatably mounted upon the reverse shaft and having one gear member in constant engagement with a gear rotatably mounted upon the countershaft but adapted to be locked thereto and the other member of such reverse gear being in constant engagement with one gear of one pair of the change speed gears.

Other advantages and meritorious features of my invention will more fully appear from the following specification, appended claims, and accompanying drawings, wherein:

Fig. 2 is a horizontal sectional view through my change speed gearing.

Figure 4:
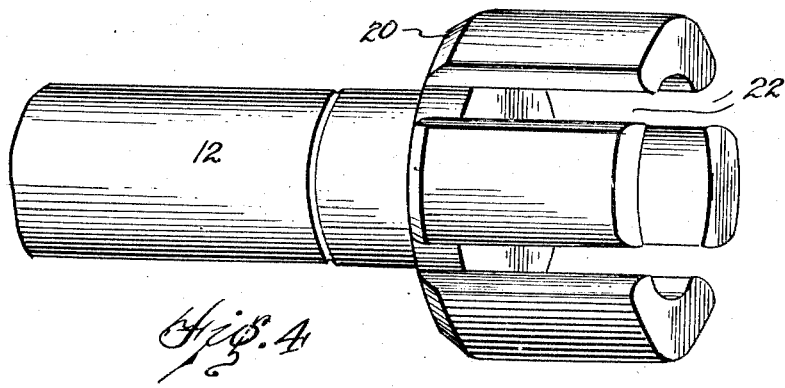
Fig. 4 is a perspective of the end of the drive shaft provided with the hub.
Figures 5, 6:
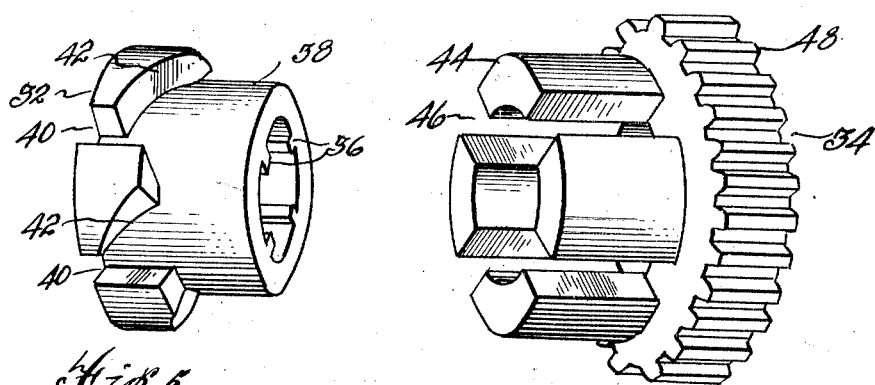
Fig. 5 is a perspective of the high speed header carried by the main shaft within the hub.
Fig. 6 is a perspective of the master gear mounted upon the main shaft adjacent the hub.
Figure 7:
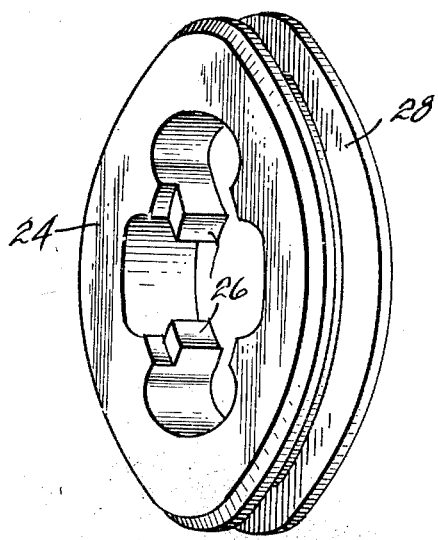
Fig. 7 is a perspective of the master clutch ring carried by the hub.

Let 10 indicate the casing of my transmission mechanism, 12 the drive shaft, 14 the main shaft, 16 the countershaft and 18 the reverse shaft. The drive shaft 12 is provided with a hub 20, shaped as illustrated in Fig. 4. In such figure this hub is shown as provided with a plurality (four being here shown) of slots 22. A master clutch ring 24 encircles the hub. This clutch ring has fingers or lugs 26 which extend through the slots 22 of the hub into the interior thereof. This master clutch ring is provided with a circumferential channel 28 within which is mounted a shifter fork 30 whereby the ring is actuated slidably longitudinally of the hub to bring the fingers 26 into position to pick up the high speed header 32 illustrated in Fig. 5, or the master gear 34 illustrated in Fig. 6 to rotate with the hub.

The high speed header 32 is freely removably splined upon the end of the main shaft, as illustrated in Fig. 2 (four splines 36 being here shown). The header is provided with a hub portion 38 and a series of locking recesses 40 (four being here illustrated), the entrance to which is facilitated by a beveled guideway 42.

The master gear 34 is rotatably mounted upon the main shaft 14 adjacent the high speed header 32. This master gear has a hub portion 44 which is cut away providing locking recesses 46 (four being here shown) which hub portion extends within the hub 20 of the drive shaft as illustrated in Fig. 2. This master gear 34 has a gear portion 48 which is in constant mesh with a drive gear 50 blocked on the countershaft 16 to drive such countershaft.

The master clutch ring 24 is actuated by the shifter fork 30 carried by the shift rod 31 to bring the lugs 26 into engagement with the high speed header 32, such lugs riding over the guide faces 42 of the header into the recesses 40, at which point they lock the header to rotate with the hub of the drive shaft and as the header is splined upon the main shaft locking the main shaft to rotate as one piece with the drive shaft. The master clutch ring is movable in the opposite direction to bring lugs 26 into the recesses 46 of the hub 44 of the master gear 34 to pick up such master gear and through it the drive gear 50 and the countershaft 16 to be driven from the drive shaft. It will be seen that when the master clutch ring is in the position illustrated in Fig. 2, the lugs 26 are disengaged from the master gear 34 and from the high speed header 32, and the change speed gearing, with the exception of the drive shaft, is idle.

The main shaft as shown is supported by bearings 13 and 15 and carries a sleeve 52 rotatably mounted thereon upon suitable bearings 54 to permit independent rotation of the main shaft. First and second speed gears 56 and 58 respectively are splined upon the sleeve (four splines 60 being here shown). The sleeve is provided with a hub 62, similarly splined, and upon which a clutch collar 64, provided with lugs 66, is mounted to rotate therewith. This clutch collar is adapted for actuation by a shifter fork 68 which is mounted upon the shifter rod 31.

The main shaft itself is provided with a hub 70 having locking recesses 72 adapted to receive the lug 66 of the clutch collar 64 to lock the sleeve 52 to the main shaft 14 to rotate therewith.

The construction is such that when the master clutch ring 24 is actuated to pick up the master gear 34 to drive the countershaft, the clutch collar 64 is also actuated to lock the main shaft 14 to the sleeve 52 to rotate therewith when such sleeve is driven through the change speed gears from the countershaft.

The countershaft is provided with first and second change speed gears, 74 and 76 respectively, freely rotatably mounted upon the countershaft and constantly in mesh with change speed gears 56 and 58 on the main shaft. Change speed gear 74 on the countershaft is provided with a hub having locking recesses 78 adapted to receive lugs 80 of a clutch collar 82, which clutch collar is splined on the countershaft and is adapted to be actuated by a shifter fork 84 carried by the shifter rod 86 to lock the first speed gear 74 to the countershaft to rotate therewith. The second speed gear 76 has a hub provided with locking recesses 88 adapted to be engaged by lugs 90 of a clutch collar 92, which clutch collar is actuated by a shifter fork 94 to pick up the second speed gear 76 to rotate with the countershaft. The clutch collar 92 is splined upon a hub 96 formed on the countershaft 16 to rotate with such shaft.

Through the change speed gears just described, it will be seen that the main shaft may be driven at varying rates of speed through the countershaft from the drive shaft.

Figure 1:
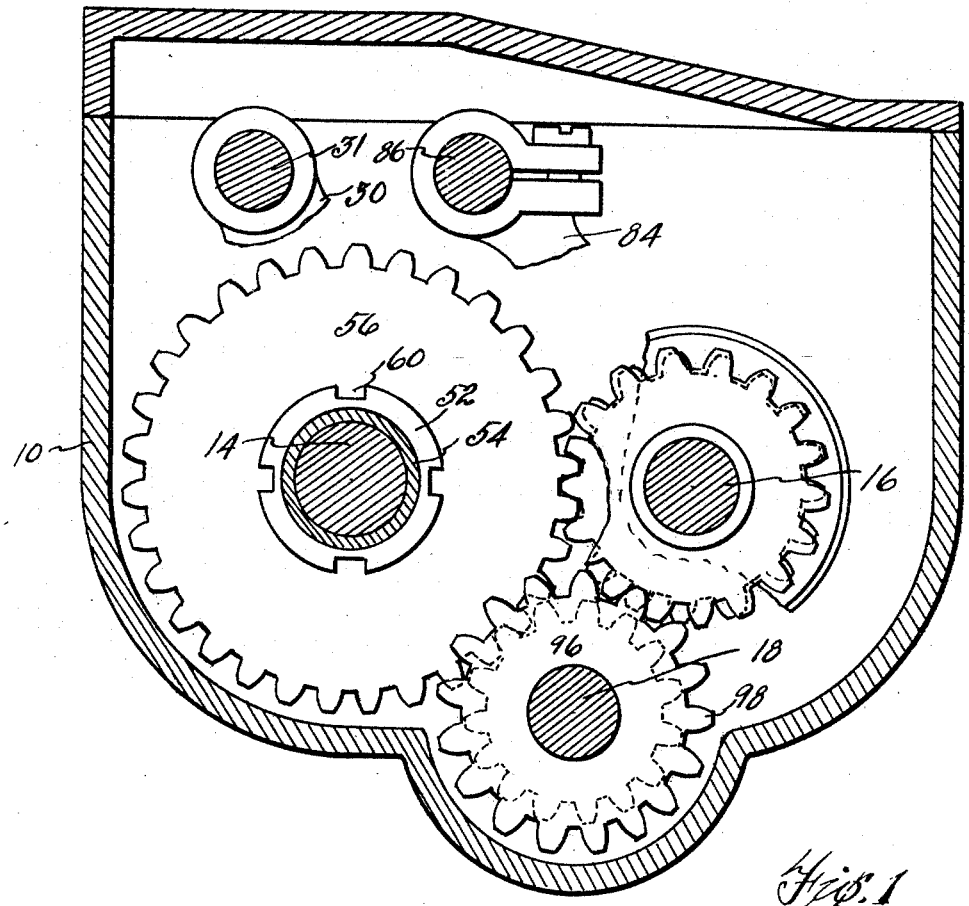
Fig. 1 is a vertical sectional view taken on line 1—1 of Fig. 2.
Figure 3:
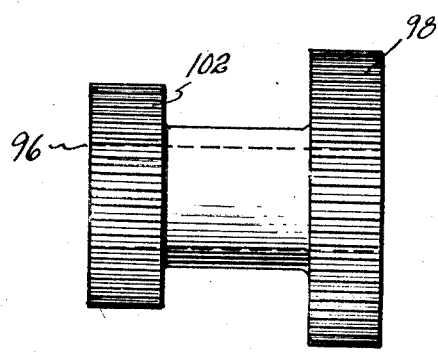
Fig. 3 is a side elevation of my improved reverse gear.

A double unitary reverse gear 96, illustrated in Fig. 3, is rotatably mounted upon the reverse shaft 18. This gear has a gear member 98 which is constantly in mesh with a reverse gear 100 rotatably mounted upon the countershaft 16 and a gear member 102 which is constantly in mesh with the change speed gear 56 upon the sleeve 52 on the main shaft. The clutch collar 82 is adapted to be actuated so that the lugs 80 pick up the reverse gear 100 by engaging in the locking recesses 104 of a hub formed on such gear.

In the operation of my improved mechanism it will be observed that the reverse gear engages one of the change speed gears of the main shaft to drive the main shaft in reverse, which change speed gear is normally used in driving the main shaft in a forward direction.

My improved gearing is adapted for ready assembly and disassembly and an important feature lies in the provision of a high speed header 32 freely removably splined on the main shaft within the hub 20, so that the main shaft may be withdrawn from such hub, leaving the header therein. The casing is normally filled with viscous lubricant which it has been found in practice is sufficient to retain the header in its place in the hub, permitting the removal of the main shaft therefrom.

What I claim is:

1. In change speed gearing, a drive shaft, a main shaft, a countershaft, a reverse shaft, a master gear rotatably mounted upon the main shaft and coupled with the countershaft to drive such shaft, a plurality of pairs of constant mesh change speed gears, one gear of each pair mounted upon the main shaft to permit independent rotation of the main shaft and the other gear of each pair mounted upon the countershaft to permit independent rotation of such shaft, a reverse gear mounted upon the countershaft to permit independent rotation of such shaft, a double reverse gear rotatably mounted upon the reverse shaft and having one of its gears in constant mesh with the reverse gear on the countershaft and the other gear of said double reverse gear in constant mesh with one of said constant mesh change speed gears on the main shaft, means for coupling the drive shaft to the main shaft to rotate the main shaft independently of the gears thereon, and means for coupling the drive shaft to the main shaft through the countershaft, including means for coupling the drive shaft with the master gear on the main shaft independently of the main shaft to drive the countershaft, means cooperating therewith for simultaneously coupling the change speed gears on the main shaft to said shaft as a unit, and means for coupling individual gears on the countershaft including the reverse gear to the countershaft to rotate therewith.

2. In change speed gearing, a drive shaft, a main shaft, a countershaft having a drive gear fixed thereto, a reverse shaft, a sleeve rotatably journaled upon the main shaft, a plurality of pairs of constant mesh change speed gears, one gear of each pair being rotatably journaled upon the countershaft, the other gear of each pair being fixed to the sleeve on the main shaft, means operable to couple individual change speed gears on the countershaft to the countershaft, a master gear rotatably supported on the main shaft at one end of the sleeve and constantly in mesh with the drive gear fixed to the countershaft, a clutch hub fixed to the main shaft at the opposite end of the sleeve, a reverse gear rotatably mounted upon the countershaft, a double reverse gear rotatably mounted upon the reverse shaft having a gear at one end constantly in mesh with the reverse gear on the countershaft and a gear at the opposite end constantly in mesh with one of the change speed gears on the sleeve, a clutch member carried by the sleeve to rotate therewith and slidable thereover to lock the sleeve to a clutch hub on the main shaft, and a clutch member carried by the countershaft and slidable thereover to lock the reverse gear thereon to the countershaft, mechanism operably engaging both clutch members to actuate them in the same direction to lock the sleeve to the clutch hub on the main shaft and the reverse gear on the countershaft to such shaft.

In testimony whereof, I, JESSE H. HAND, sign this specification.

JESSE H. HAND.